United States Patent
Saitoh et al.

(10) Patent No.: US 7,098,972 B2
(45) Date of Patent: Aug. 29, 2006

(54) LIQUID CRYSTAL PROJECTOR WITH DIFFERENT SHAPED HOUSING FOR EACH LIQUID CRYSTAL PANEL DEPENDENT ON COLOR

(75) Inventors: Hiromi Saitoh, Chino (JP); Tomoaki Miyashita, Shimosuwa-machi (JP); Hiroyuki Kojima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 98 days.

(21) Appl. No.: 10/790,859

(22) Filed: Mar. 3, 2004

(65) Prior Publication Data

US 2004/0212747 A1 Oct. 28, 2004

(30) Foreign Application Priority Data

Mar. 27, 2003 (JP) ............................. 2003-088813
Nov. 13, 2003 (JP) ............................. 2003-384073

(51) Int. Cl.
*G02F 1/1333* (2006.01)
(52) U.S. Cl. .............................. 349/58; 349/5; 353/119
(58) Field of Classification Search ................ 349/58, 349/119, 5–10; 353/119
See application file for complete search history.

(56) References Cited

U.S. PATENT DOCUMENTS 6,290,360 B1    9/2001  Konuma et al.
6,375,328 B1*   4/2002  Hashizume et al. .......... 353/30
6,439,299 B1*   8/2002  Miyahara et al. ........... 165/121
6,659,168 B1*  12/2003  Barsun ...................... 165/80.3
6,731,354 B1*   5/2004  Menard ....................... 349/58
6,741,354 B1*   5/2004  Numai ....................... 356/461
6,891,104 B1*   5/2005  Dinh .......................... 174/67
2002/0060779 A1* 5/2002  Furuhata et al. ............. 353/31

FOREIGN PATENT DOCUMENTS

| JP | A 2001-318361 | 11/2001 |
| JP | A 2002-214703 | 7/2002 |
| JP | A 2003-015104 | 1/2003 |
| JP | A 2003-075912 | 3/2003 |
| WO | WO 98/36313 | 8/1998 |

* cited by examiner

*Primary Examiner*—Andrew Schechter
*Assistant Examiner*—Phu Vu
(74) *Attorney, Agent, or Firm*—Oliff & Berridge, PLC

(57) ABSTRACT

The invention provides a cased electro-optical apparatus that can include an electro-optical unit that receives light in the image display area from a light source, a plate that opposes one side of the electro-optical unit, and a cover for covering the electro-optical unit. The cased electro-optical apparatus can have a case for containing the electro-optical unit by supporting at least a portion of the periphery of the image display area of the electro-optical unit by the plate and/or the cover. One of the plate and the cover is selected from a plurality of ones having different shapes and each of the plurality of ones is attachable to the other.

7 Claims, 12 Drawing Sheets

F I G. 9
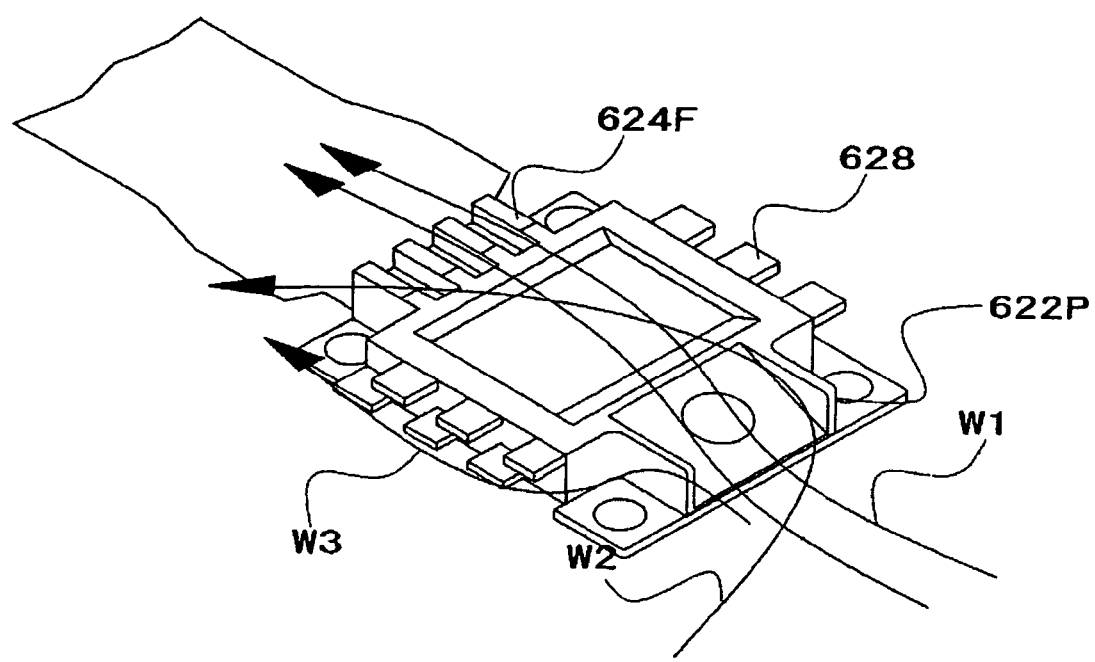

LIQUID CRYSTAL PROJECTOR WITH DIFFERENT SHAPED HOUSING FOR EACH LIQUID CRYSTAL PANEL DEPENDENT ON COLOR

BACKGROUND OF THE INVENTION

1. Field of Invention

The present invention belongs to technical fields related to a case for containing an electro-optical unit, such as a liquid crystal panel used as a light valve for a projection display apparatus, for example, a liquid crystal projector, a cased electro-optical apparatus composed of a case mounting or containing the electro-optical unit, and a projection display apparatus having a cased electro-optical apparatus.

2. Description of Related Art

In general, when a liquid crystal panel is used as a light valve for a liquid crystal projector, a bare liquid crystal panel is not disposed on the chassis of the liquid crystal projector. Instead, the liquid crystal panel can be mounted or contained in an appropriate case. This cased liquid crystal panel is disposed onto the chassis. Appropriate screw holes are formed on the case so that the cased liquid crystal panel can be easily fixed onto the chassis.

In such a liquid crystal projector, light emitted from a light source is concentrated and projected onto the cased liquid crystal panel. The light can be transmitted through the liquid crystal panel to project an enlarged image on a screen. Since, in general, the liquid crystal projector is expected to project enlarged images, relatively strong light emitted from the light source, such as a metal halide lamp, is used.

For this reason, a temperature increase in the cased liquid crystal panel becomes a problem. If a temperature increase occurs, the temperature of the liquid crystal interposed between a pair of transparent substrates also increases and causes the liquid crystal to degrade. Specifically, when the light from the light source is uneven, the liquid crystal panel becomes partially heated and so-called 'hot spots' are generated. For this reason, the transmittance of the liquid crystal becomes uneven, and the image quality of the projected image is degraded.

Known cased liquid crystal panels have the following problems. For example, a liquid crystal projector capable of displaying color images includes a plurality of cased liquid crystal panels for each color, i.e., red, green, and blue. In this case, the three cased liquid crystal panels for each color must not have extremely different properties. More specifically, as described above, a relatively strong light enters the cased liquid crystal panel, and, as a result, the temperature of the cased liquid crystal panel increases. Preferably, the temperature increase for each cased liquid crystal panel should be kept almost the same.

In general, however, this is difficult to achieve. For instance, when a plurality of cased liquid crystal panels are included in a liquid crystal projector, the cased liquid crystal panels might be disposed in different orientations or might be in different environments. An example of the latter is a situation wherein cooled air sent out from a cooling fan also disposed on the liquid crystal projector operates unevenly upon each liquid crystal panel. For example, one of the liquid crystal panels might receive the cooled air and, thus, will be cooled. On the other hand, another liquid crystal panel might not receive the cooled air and, thus, will not be cooled.

In such a situation, the temperature of one of the liquid crystal panels will increase extremely compared to the other liquid crystal panels. Consequently, it becomes necessary to prevent the degradation of a liquid crystal layer and the generation of hot spots in the liquid crystal panel undergoing the extreme temperature increase. Also, it becomes necessary to maintain an ideal equilibrium in the amount of temperature increase of each liquid crystal panel as much as possible. If equilibrium is not maintained, the liquid crystal projector might not operate stably.

In general, the liquid crystal panel receiving blue light experiences a greater temperature increase compared to the liquid crystal panel receiving red or green light. This might also cause a difference in the properties of each liquid crystal panel.

SUMMARY OF THE INVENTION

The present invention has taken into consideration the above-mentioned problems. Accordingly, it is an object of the present invention to provide cases, cased electro-optical apparatuses, and a projection display apparatus having the cases and the cased electro-optical apparatuses that enable display of higher quality images and stable operation of the whole apparatus, by preventing the electro-optical apparatuses included in the projection display apparatus from having extremely different properties.

The cased electro-optical apparatus according to the present invention can include an electro-optical unit that receives light in the image display area from a light source, a plate that opposes one side of the electro-optical unit, and a cover for covering the electro-optical unit. The cased electro-optical apparatus has a case for containing the electro-optical unit by supporting at least a portion of the periphery of the image display area of the electro-optical unit by at least one of the plate and the cover. One of the plate and the cover is selected from a plurality of ones having different shapes and each of the plurality of ones is attachable to the other.

The cased electro-optical apparatus according to the present invention can include an electro-optical unit that receives light in the image display area from a light source contained inside a case comprising a cover and a plate. An example of such an electro-optical unit is a liquid crystal apparatus or a liquid crystal panel disposed on a projection display apparatus as a light valve. By covering at least a portion of the periphery of the electro-optical unit, the case can have a light blocking effect for preventing light leakage in the periphery of the electro-optical unit and preventing stray light from entering the image display area.

According to the present invention, a plurality of either the plates or the covers (hereafter, the cover can represent both the plate and the cover) exists in different shapes. All of the differently-shaped plates and covers are attachable to each other. More specifically, the cover composing the case according to the present invention may be shaped differently as follows: a case with a small or large surface area; a case with or without a surface area increasing portion such as fins as described below; a case with a large or small surface area increase caused by the fins; or a combination of these factors. These differently-shaped covers are attachable to a plate commonly used for all the differently-shaped covers.

Depending on the difference in performance of a plurality of projection display apparatuses, such as a difference in the intensity of the light emitted from the light source when the cased electro-optical apparatus is used as a light valve for the projection display apparatus, or depending on the positioning or location of the light valves when the plurality of light valves are disposed inside the projection display apparatus, a cover may be selected from different shapes and be disposed on the cased electro-optical apparatus. Thus, according to the present invention, the shape of the case can be easily changed to suit various circumstances. More specifically, for example, when light projected to a projection display apparatus is extremely intense and the light projected to another projection display apparatus is not so intense, a cased electro-optical apparatus with a cover with a larger surface area can be disposed on the former projection display apparatus and a cased electro-optical apparatus with a smaller surface area can be disposed on the latter. In this way, the cover of the former projection display apparatus will have a powerful heat dissipation ability. Thus, the projection display apparatus will be able to operate stably in more intense projected light.

Even with the above-mentioned advantages, only one plate needs to be prepared for the present invention and this plate can be commonly used for the differently-shaped covers. Consequently, the production cost becomes inexpensive.

The present invention was described above assuming that a plurality of covers with different shapes existed and that only one plate was commonly used for all the differently-shaped covers. The present invention, however, also includes a structure wherein one cover and a plurality of plates exist.

In an embodiment of the cased electro-optical apparatus according to the present invention, the difference in shape correspond to the difference in surface area among the covers (or the plates). According to this embodiment, when there are covers having different shapes, these different shapes correspond to the different surface areas of the covers. Since the surface areas of the covers differ, a cover with a larger surface area is capable of dissipating more heat compared to a cover with a smaller surface area. Based on this, according to this embodiment, when thermal storage in the electro-optical unit occurs easily, the electro-optical unit may be contained in a case with a larger surface area and, when not, the electro-optical unit may be contained in a case with smaller surface area.

In general, when there is a difference in surface area, a cover with a larger surface area is large-sized and a cover with a smaller surface area is small-sized. Consequently, when sufficient space is available for disposing an electro-optical unit, the large-sized cover may be used, and when sufficient space is unavailable, the small-sized cover may be used.

For another embodiment of a cased electro-optical apparatus according to the present invention, the plate and the cover have a surface area increasing portion for increasing the surface area. Furthermore, the plate and the cover are selected from differently-shaped plates and covers having different surface areas increased by the surface area increasing portion. According to this embodiment, the differently-shaped covers each correspond to the different surface areas increased by the surface area increasing portions disposed on each cover. Since the amount of increase in the surface area of each cover differs, a cover with a larger surface area dissipates more heat compared to a cover with a smaller surface area. Consequently, an advantage similar to the above-mentioned embodiment is gained.

In this embodiment, the surface area increasing portion may be, for example, fins protruding from the surface of the cover or dimples formed on the surface. Here, the difference between fins' and dimples is whether they are protrusions or indentions from the surface of the cover. The fins and dimples may be formed during or after the cover body is prepared by, for example, cutting, forging, press working, injection molding, or casting.

In another embodiment of a cased electro-optical apparatus according to the present invention, the plates and covers having different shapes correspond to whether or not the plates or the covers each have a surface area increasing portion for increasing the surface area.

In the cased electro-optical apparatus according to the present invention, the different shapes correspond to whether or not each of the covers has a surface area increasing portion for increasing the surface area. Since the cover has or does not have a surface area increasing portion, the cover with the surface area increasing portion dissipates more heat compared to the cover without one. Consequently, an advantage similar to the above-mentioned embodiment is gained.

To solve the above-mentioned problems, the case according to the present invention can include a plate opposing a surface of an electro-optical unit that receives light in an image display area from a light source and a cover for covering the electro-optical unit. The case contains the electro-optical unit by supporting at least a portion of the periphery of the image display area of the electro-optical unit by at least one of the plate and the cover. One of the plate and the cover is selected from a plurality of ones having different shapes and each of the plurality of ones is attachable to the other.

According to the present invention, a case suitable for the cased electro-optical apparatus according to the present invention can be provided.

To solve the above-mentioned problems, the projection display apparatus according to the present invention can have a light source, a plurality of electro-optical units that receive light from the light source, an optical system that directs the light to the electro-optical unit, a projection optical system for projecting light emitted from the electro-optical unit, a first case for containing at least one of the electro-optical units, and a second case having a different shape compared to the first case for containing at least one of the electro-optical units not contained in the first case. In the projection display apparatus according to the present invention, the light emitted from the light source is directed in sequence through the optical system, the electro-optical unit, and the projection optical system. Finally, the projection optical system projects the light onto, for example, a screen to display images. In this case, a light source capable of emitting relatively strong light, for example, a metal halide lamp, is suitable because the projection optical system typically projects enlarged images of the light emitted from the electro-optical unit.

In particular, the projection display apparatus according to the present invention has a plurality of electro-optical units. At least one of the electro-optical units is contained in a first case and the rest are contained in a second case. The first case has a different shape compared to the second case. Here, the first and second cases having different shapes can mean that the entire shape of the case differs or that the shape of a part of the case differs. More specifically, examples of cases having different shapes may be cases having large and small total surface areas.

Accordingly, according to the difference in the positioning of the plurality of electro-optical units disposed on one projection display apparatus, such as according to the difference in the mounting angle against the light source of the electro-optical unit or according to the difference in how easily cooling air reaches each disposed electro-optical unit, an appropriate case for containing each electro-optical unit may be selected. For example, as described above, when light is emitted from the metal halide lamp, which is a relatively strong light source, to the cased electro-optical apparatus and causes a temperature increase and when the temperature increase of each electro-optical unit is expected to be different, the first and second cases may be selected according to the difference in temperature increase. It is preferable for the first and second cases to have different shapes due to the difference in their surface areas, as described above. This is because if the first case is larger than the second case, the first case dissipates more heat compared to the second case. For this reason, the electro-optical units that are expected to undergo large temperature increases can be contained in the first case and the ones that do not undergo large temperature increases can be contained in the second case. In this way, cooling of the former electro-optical units can be improved. Accordingly, it becomes possible to prevent one of the electro-optical units disposed inside one projection display apparatus from undergoing an extremely large or small temperature increase compared to the other electro-optical units, and thus, the projection display apparatus may be operated stably.

As described above, according to the present invention, it becomes possible to select cases with different shapes suitable for various circumstances concerning the electro-optical units included in the projection display apparatus. In this way, equilibrium may be reached among the electro-optical units when the projection display apparatus is viewed as a whole. Moreover, stable operation of the projection display apparatus becomes possible.

In the present invention, the first case and the second case are essential elements. The present invention, however, may include a third case having a different shape compared to the first and second cases. If necessary, a fourth case having a different shape compared to the first, second, and third cases may be included.

An example of using different cases depending on the difference in temperature increase of the electro-optical unit has been described above. In the present invention, different cases may be selected to suit various circumstances. For example, when there is sufficient space for disposing one electro-optical unit but not enough space for disposing another electro-optical unit, the former electro-optical unit may have a moderately large case, i.e., the first or second case, and the later may have a moderately small case, i.e., the second or first case. This structure may also be included in the range of the present invention. In this way, a plurality of electro-optical units may be disposed inside one projection display apparatus without any problems.

In an embodiment of the projection display apparatus according to the present invention, the first case and the second case each include a plate opposing one side of the electro-optical unit and a cover attachable to the plate for covering the electro-optical unit. The first and the second cases have different shapes.

The cases according to this embodiment are composed of a plate and a cover. Since the first case and the second case have different shapes, the cases according to the embodiment include cases having different shapes. Therefore, for example, the case may have a plate that can be commonly used for any differently-shaped cover (in this way, the shape of the case may change but the shape of the plate does not). As a result, the production cost is inexpensive compared to changing the shape of the entire case. Furthermore, when the various circumstances concerning the electro-optical units change and the shapes of the cases have to be changed accordingly, to change the shapes of the cases according to this embodiment, only the covers need to be changed. Thus, the cases according to this embodiment are advantageous in that they have flexibility to change in any circumstance. In this case, preferably, the plate has an attachment section for attaching the case to a surface to be attached of the projection display apparatus. In this way, regardless of whether or not the cover is replaced, the attachment of the plate to the surface to be attached is essentially not changed. On the other hand, if the attachment section is formed on the cover, the position of the attachment section generally has to be changed according to the change in the shape of the cover. Therefore, although it is possible keep the way the cover is attached to the attachment section unchanged, it is difficult. Thus, the cover is attached to the case or the cased electro-optical apparatus of the projection display apparatus in the same way as previous ways, but, in addition, the shape of the case may be changed compared to the previous shapes. Consequently, the above-mentioned advantages become more effective.

In this embodiment, the first case may have a first cover with a larger surface area and the second case may have a second cover with a smaller surface area. According to the structure of this embodiment, the difference in the surface areas of the covers indicates that the first case and second case have different shapes. The first case having the first cover with a larger surface area dissipates more heat compared to the second case having the second cover with a smaller surface area. Consequently, the most suitable case may be selected among the first case and the second case according to this embodiment when, for example, a difference in the temperature increase is expected among the electro-optical units. More specifically, the electro-optical units that are expected to exhibit a large temperature increase may preferably be contained in the first case having the first cover. The electro-optical units not expected to exhibit a large temperature increase may preferably be contained in the second case having the second cover.

Since there is a difference in the surface areas of the covers, in general, the cover with the larger surface area is large-sized and the cover with the smaller surface area is small-sized. Thus, when there is sufficient space for disposing the electro-optical unit, the large-sized cover may be preferably used and when there is not sufficient space, the small-sized cover may be preferably used.

Alternatively, the covers may have surface area increasing portions. Accordingly, the first case may have a third cover having a surface area increased by the surface area increasing portion. The second case may have a fourth cover having a surface area increased to a lesser degree compared to the third cover by the surface area increasing portion.

As mentioned above, for example, when the electro-optical units are expected to undergo a different level of temperature increase, the first case or the second case, whichever is most suitable, may be selected.

Since, according to the structure of this embodiment, the cover has a surface area increasing portion, the heat dissipation ability of the cover is improved as compared to a cover with no surface area increasing portion. Therefore, the cover according to this embodiment is advantageous because the electro-optical unit can be cooled more effectively.

In this embodiment, the significance of the surface area increasing portion is as described above. Moreover, the first case may have a fifth cover with a surface area increasing portion for increasing the surface area. The second case may have a sixth case without a surface area increasing portion.

According to the structure of this embodiment, when the electro-optical units are expected to undergo different levels of temperature increase, similar as the above, the first case or the second case, whichever is most suitable, may be selected. Since this embodiment includes covers with and without surface area increasing portions, the difference in the heat dissipation abilities of the covers is relatively large. Therefore, as mentioned above, when the difference in temperature increase among the electro-optical units is expected to be particularly large, the structure of this embodiment is very effective.

In another embodiment of the projection display apparatus of the present invention, a plurality of electro-optical units corresponds to light components, which are independent of each other, separated from light emitted from a light source. The first case corresponds to at least one light component and the second case corresponds to the remaining light components.

According to this embodiment, the light emitted from a projection optical system is used to display color images. The optical system includes dichroic mirrors and other mirrors to separate white light. A dichroic prism is included in the projection optical system to recombine the light emitted from each electro-optical unit.

In this embodiment, according to the various circumstances concerning the separation of light components, the first case or the second case is selected. For example, in order for each of the electro-optical units to correspond to the light components, which are independent from each other, the positioning of the electro-optical units and the positioning of the light path for each light component must be adjusted and well worked out. Some of the electro-optical units may have to be contained inside the projection display apparatus and be disposed in a relatively small space. In such a case, the electro-optical units that have to be disposed in a small space may be preferably contained in a first case or a second case having smaller sizes and the electro-optical units that are disposed in a larger space may be preferably contained in a second case or a first case having a larger size. This embodiment may take on such a structure.

In this embodiment, the independent light components are red, green, and blue. The first cases correspond to blue and the second cases correspond to red and green. Also, the surface area of the first case may be larger than the surface area of the second cases. In this way, the first case and the second case may be preferably selected and may be used according to the various circumstances concerning the separation of the light components. In particular, the blue light component differs from the other light components as described below. In other words, the electro-optical units that receive the blue light component generate heat easier than the electro-optical units that receive other light components. This is because the energy of the blue light component, which has a shorter wavelength, is greater than the other light components. Consequently, degradation of the liquid crystal layer and generation of hot spots occur easily in the electro-optical unit that receives the blue light.

For this reason, the electro-optical unit that corresponds to the blue light component is contained in the first case with a larger surface area and the other electro-optical units that correspond to the other light components are contained in the second case with a smaller surface area. Consequently, cooling of the electro-optical unit corresponding to the blue light component is improved compared to the electro-optical units corresponding to other light components, and thus, thermal storage of the electro-optical unit corresponding to the blue light component is suppressed. Furthermore, a difference in the level of thermal storage between the electro-optical units corresponding to the blue light component and the electro-optical unit corresponding to the red and green light components is prevented. Thus, equilibrium among the electro-optical units is maintained, and the projection display apparatus can be operated stably.

BRIEF DESCRIPTION OF THE DRAWINGS

The invention will be described with reference to the accompanying drawings, wherein like numerals reference like elements, and wherein:

FIG. 9 is a perspective view of the cased electro-optical apparatus and shows typical air flows inside the cased electro-optical apparatus;

DETAILED DESCRIPTION OF PREFERRED EMBODIMENTS

Embodiments according to the present invention are described below with reference to drawings.

Figure 1:
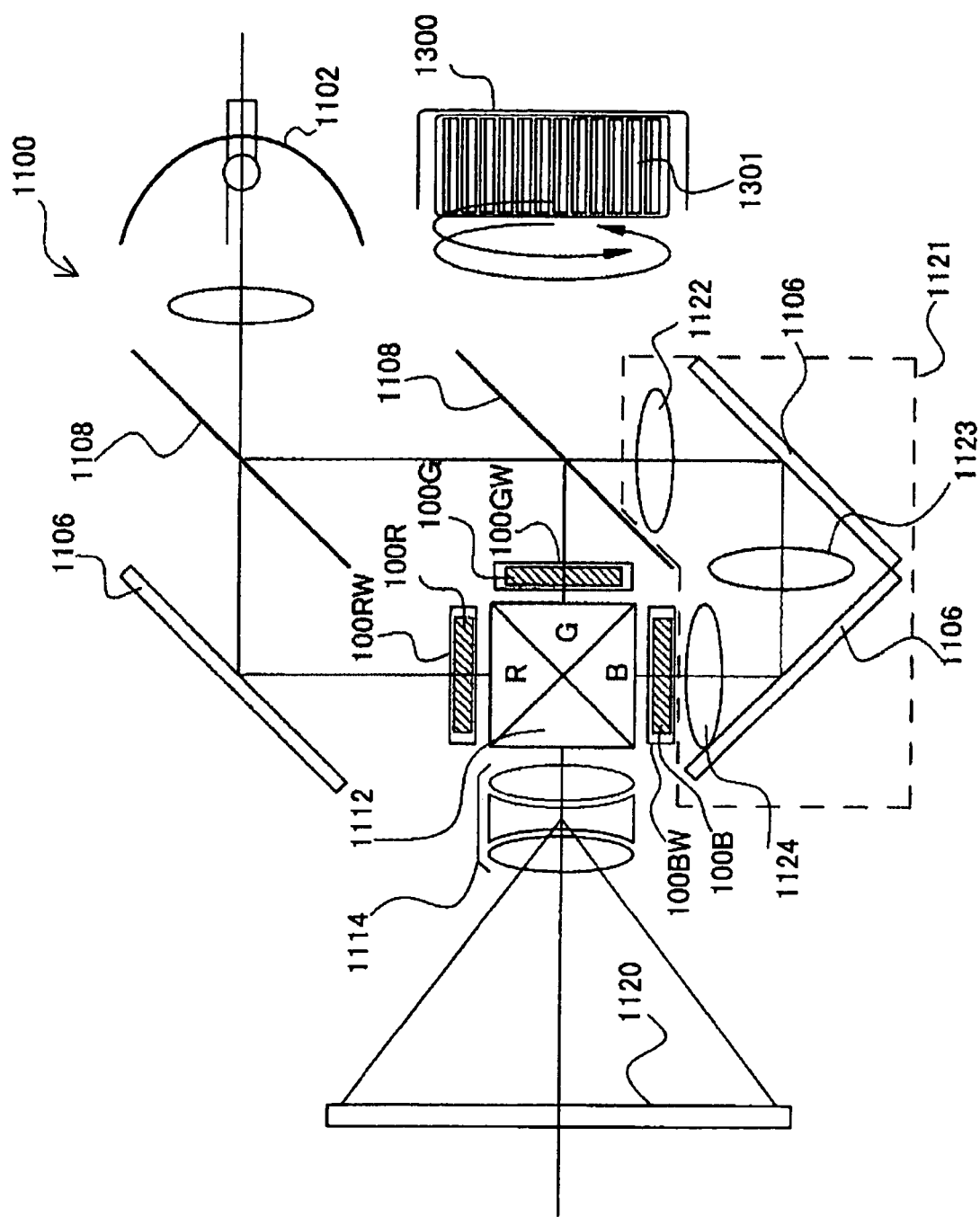
FIG. 1 is a plan view of an embodiment of a projection display apparatus according to the present invention.

With reference to FIG. 1, an embodiment of a liquid crystal projection apparatus according to the present invention is described. In particular, the optical system contained in an optical unit of the liquid crystal projection apparatus is described. A projection display apparatus according to the present invention is an example of a cased electro-optical apparatus. This projection display apparatus is a composite color projector with three light crystal light valves.

In FIG. 1, a liquid crystal projector 1100, which is an example of a composite color projector according to an embodiment of the present invention, can include three liquid crystal light valves each including an electro-optical unit with a driving circuit disposed on a thin-film transistor (TFT) arrayed substrate. Each liquid crystal light valve for red, green or blue is referred to as a light valve 100R, 100G or 100B, respectively. In the liquid crystal projector 1100, the light emitted from a lamp unit 1102 of a while light source, such as a metal halide lamp, is separated into three light components R, G, and B, which correspond to three primary light colors R, G, and B, by three mirrors 1106 and two dichroic mirrors 1108. Then the three light components R, G, and B, are sent to the light valves 100R, 100G, and 100B, respectively. In particular, the blue light is sent to the light valve 100B via a relay lens system 1121 including an input lens 1122, a relay lens 1123, and an output lens 1124. The light components corresponding to the three primary light colors, which were each modulated by the light valve 100R, 100G, or 100B are recombined by a dichroic prism 1112 to project a color image through a projection lens 1114 onto a screen 1120.

The light valve 100R, 100G, or 100B of this embodiment, for example, may be an active matrix-driven liquid crystal apparatus including a TFT as a switching element, as described below. The light valves 100R, 100G, and 100B are cased electro-optical apparatuses, as described below.

The liquid crystal projector 1100, as shown in FIG. 1, has a sirocco fan 1300 for sending cooling air to the light valves 100R, 100G, and 100B. The sirocco fan 1300 may include a substantially cylindrical member with a plurality of blades 1301 mounted on the sides. The cylindrical member rotates around its axis so that the blade 1301 generates wind. Based on this mechanism, the wind generated by the sirocco fan 1300 swirls in a spiral pattern, as shown in FIG. 1.

This wind is sent to each light valve 100R, 100G; or 100B via air passage not shown in FIG. 1. The wind is sent to the light valves 100R, 100G and 100B from outlets 100RW, 100GW, and 100BW formed in the proximity of the light valves 100R, 100G and 100B, respectively. Using the above-mentioned sirocco fan 1300 is advantageous since wind can be sent easily to narrow spaces around the light valves 100R, 100G and 100B with high static pressure.

For the above-mentioned structure, the light emitted from the lamp unit 1102, which is a powerful light source, causes a temperature increase in the light valves 100R, 100G and 100B. An extreme temperature rise might cause degradation of the liquid crystals of the light valves 100R, 100G and 100B or unevenness of transmittance due to hot spots generated by uneven heating of the liquid crystal panel caused by unevenness of the light source. To prevent these problems, in this embodiment, the light valves 100R, 100G and 100B are equipped with cases that are capable of cooling the electro-optical unit, as described below. Consequently, the temperature increase of the light valves 100R, 100G and 100B are suppressed effectively.

Preferably, this embodiment includes a cooling device including a circulation apparatus for circulating a cooling medium in the periphery of the light valves 100R, 100G and 100B, inside the housing of the liquid crystal projector 1100. In this way, heat dissipation from the cased electro-optical apparatus with heat dissipation function can be more effectively performed, as described below.

Figure 2:
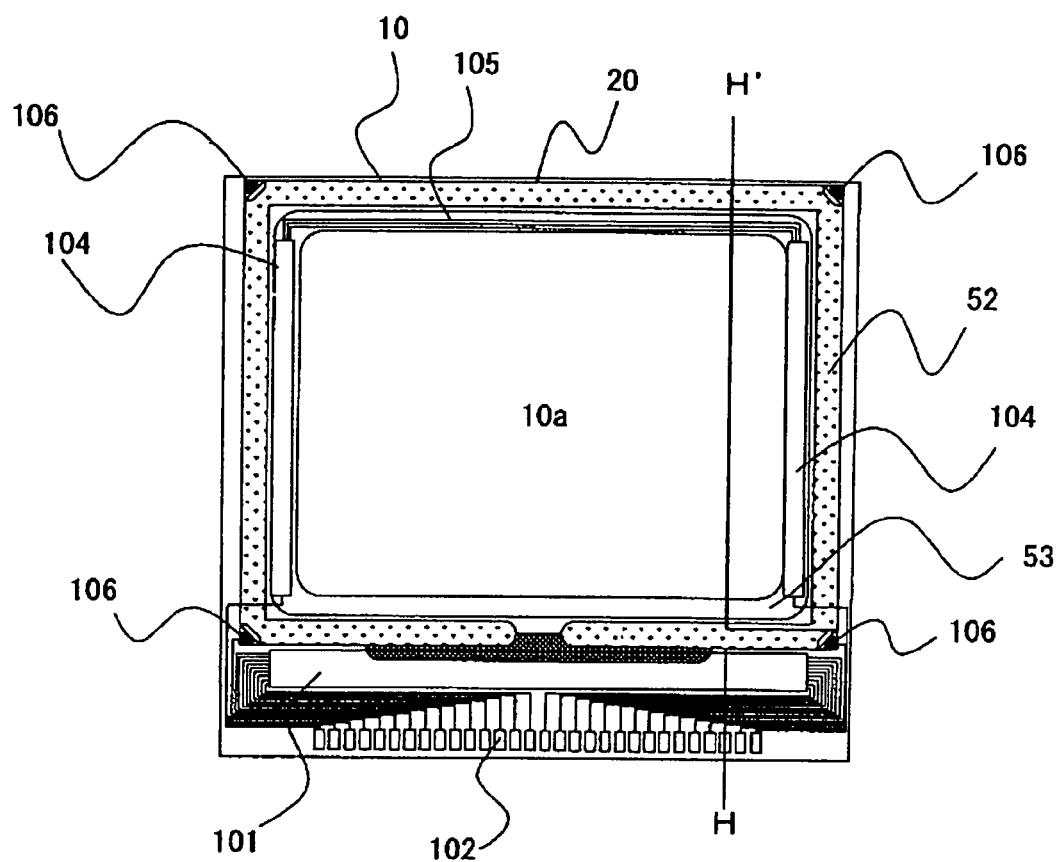
FIG. 2 is a plan view of an embodiment of an electro-optical unit according to the present invention.
Figure 3:
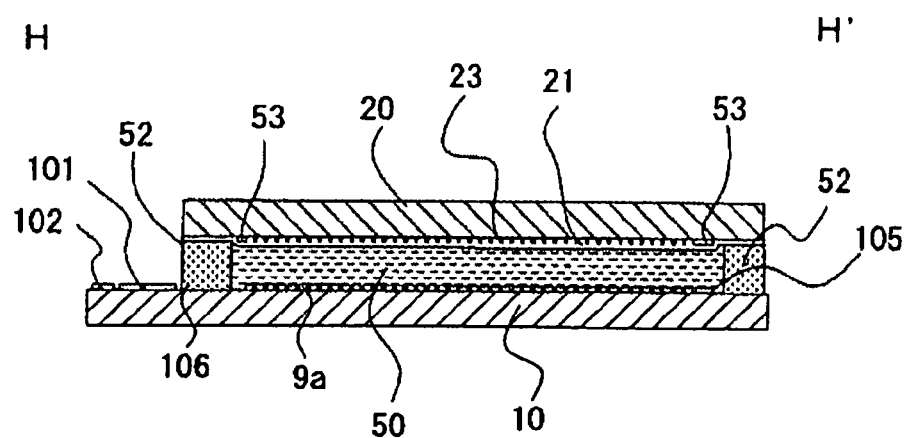
FIG. 3 is a cross-sectional view taken along line H–H' in FIG. 2.

Next, the overall structure of an embodiment of an electro-optical unit according to the present invention is described with reference to FIGS. 2 and 3. Here, a TFT active matrix-driven liquid crystal apparatus having a built-in driving circuit is described as an example of an electro-optical unit. The electro-optical unit according to the present invention is used as a light valve 100R, 100G or 100B of the above-mentioned liquid crystal projector 1100. FIG. 2 is a plan view showing main components on a TFT arrayed substrate of the electro-optical unit viewed from an opposing substrate. FIG. 3 is a cross-sectional diagram taken along line H–H' of FIG. 2.

In FIGS. 2 and 3, a TFT arrayed substrate 10 and an opposing substrate 20 are disposed so that they face each other in the electro-optical unit according to this embodiment. A liquid crystal layer 50 is interposed between the TFT arrayed substrate 10 and the opposing substrate 20. The TFT arrayed substrate 10 and the opposing substrate 20 are bonded to each other by a sealant 52 disposed on a sealing area on the circumference of an image display area 10a.

The sealant 52 is, for example, an ultraviolet-curable resin or a heat-curable resin, for bonding the two substrates together. After the sealant 52 is applied onto the TFT arrayed substrate 10 during the production process, it is cured by ultraviolet ray emission or heating. Moreover, a gap material, such as glass fiber or glass beads, is distributed in the sealant 52 in order to maintain the gap between the TFT arrayed substrate 10 and the opposing substrate 20 at a predetermined value. The electro-optical unit of this embodiment is compact and is suitable as a light valve of the projector for projecting enlarged images.

Along the inner side of the sealing area in which the sealant 52 is arranged, a light-shielding film frame 53 having a light blocking effect is disposed on the opposing substrate 20 for determining the frame area of the image display area 10a. The light-shielding film frame 53 may be entirely or partly disposed on the TFT arrayed substrate 10 as a built-in light-shielding film.

Along the outer area of the sealing area in which the sealant 52 is arranged, a data line driving circuit 101 and an external circuit connecting terminal 102 are disposed along one edge of the TFT arrayed substrate 10. Scanning line driving circuits 104 are disposed along the two other edges extending pendicularly from the edge of the TFT arrayed substrate 10 and are covered by the light-shielding film frame 53. To connect each of the scanning line driving circuits 104 disposed on both sides of the image display area 10a, a plurality of lead lines 105 is disposed along the remaining edge of the TFT arrayed substrate 10 and is covered with the light-shielding film frame 53.

On the four corners of the opposing substrate 20, a vertical conductor 106 is disposed as a vertical conducting terminal between the substrates. On the TFT arrayed substrate 10, vertical conducting terminals are disposed in the area that opposes the corners of the opposing substrate 20. The conducting terminals provide electrical conductivity between the TFT arrayed substrate 10 and the opposing substrate 20.

As shown in FIG. 3, on the TFT arrayed substrate 10, a picture electrode 9a is disposed after forming the TFT's for pixel switching and the wires such as scanning lines and data lines. Then on top of these, an alignment film, not shown in the drawing, is disposed. On the opposing substrate 20, an opposing electrode 21 and light-shielding films 23 having a check or stripe pattern are disposed. Then on top of these, an alignment film, not shown in the drawing, is disposed. The liquid crystal layer 50 is composed of one type or several types of nematic liquid crystal(s) and has a predetermined alignment between the pair of alignment films.

On the TFT arrayed substrate 10, shown in FIGS. 2 and 3, in addition to the data line driving circuit 101 and the scanning line driving circuits 104, the following circuits may be formed: a sampling circuit that samples image signals on the image signal lines and sending these signals to the data lines, a precharge circuit that supplies precharge signals with a predetermined voltage level to a plurality of data lines precedent to image signals, and/or an inspection circuit that inspects the quality and defects of the electro-optical unit during production or at shipping.

Figure 4:
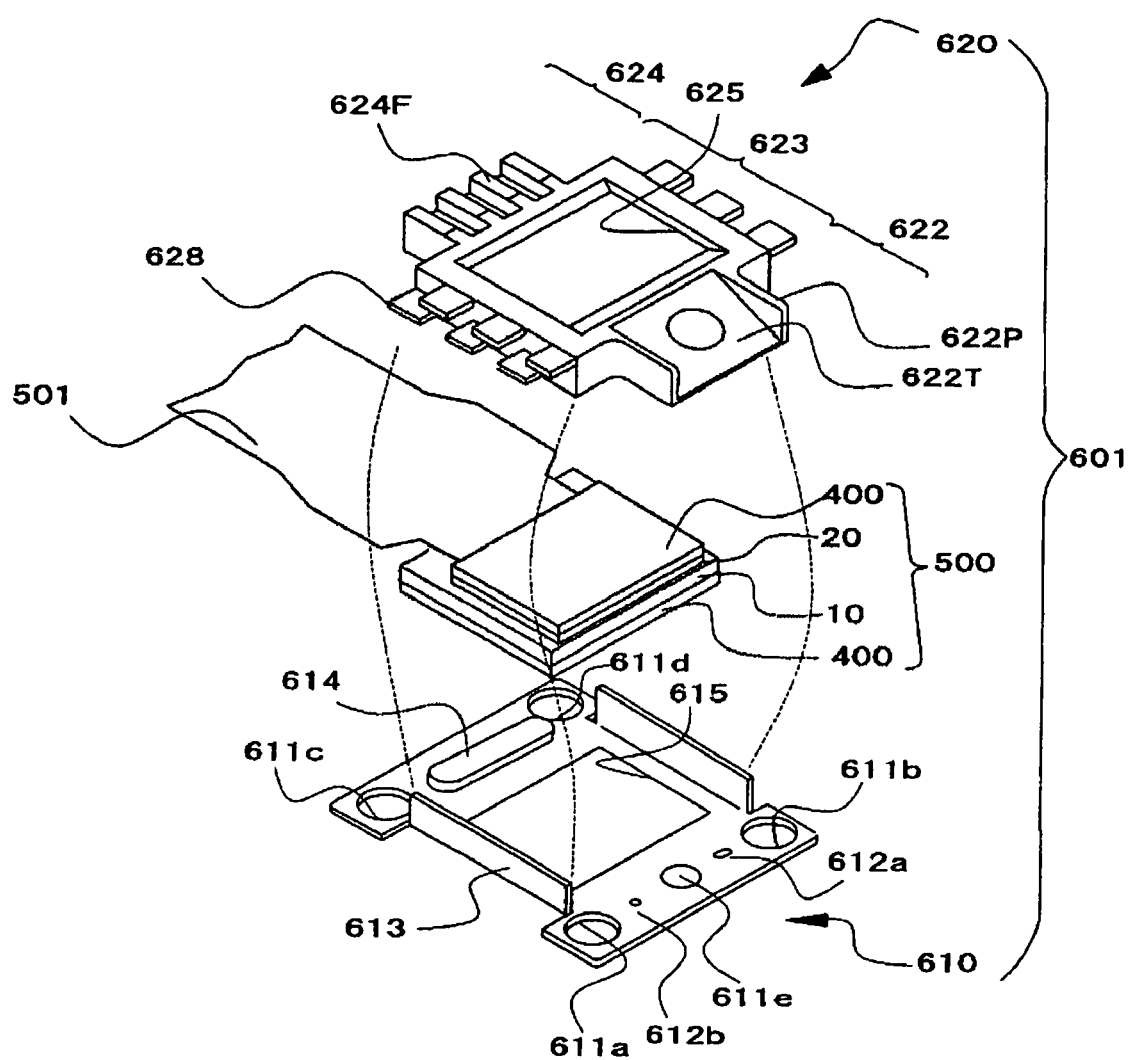
FIG. 4 is an exploded perspective view showing a case according to this embodiment and an electro-optical unit.
Figure 5:
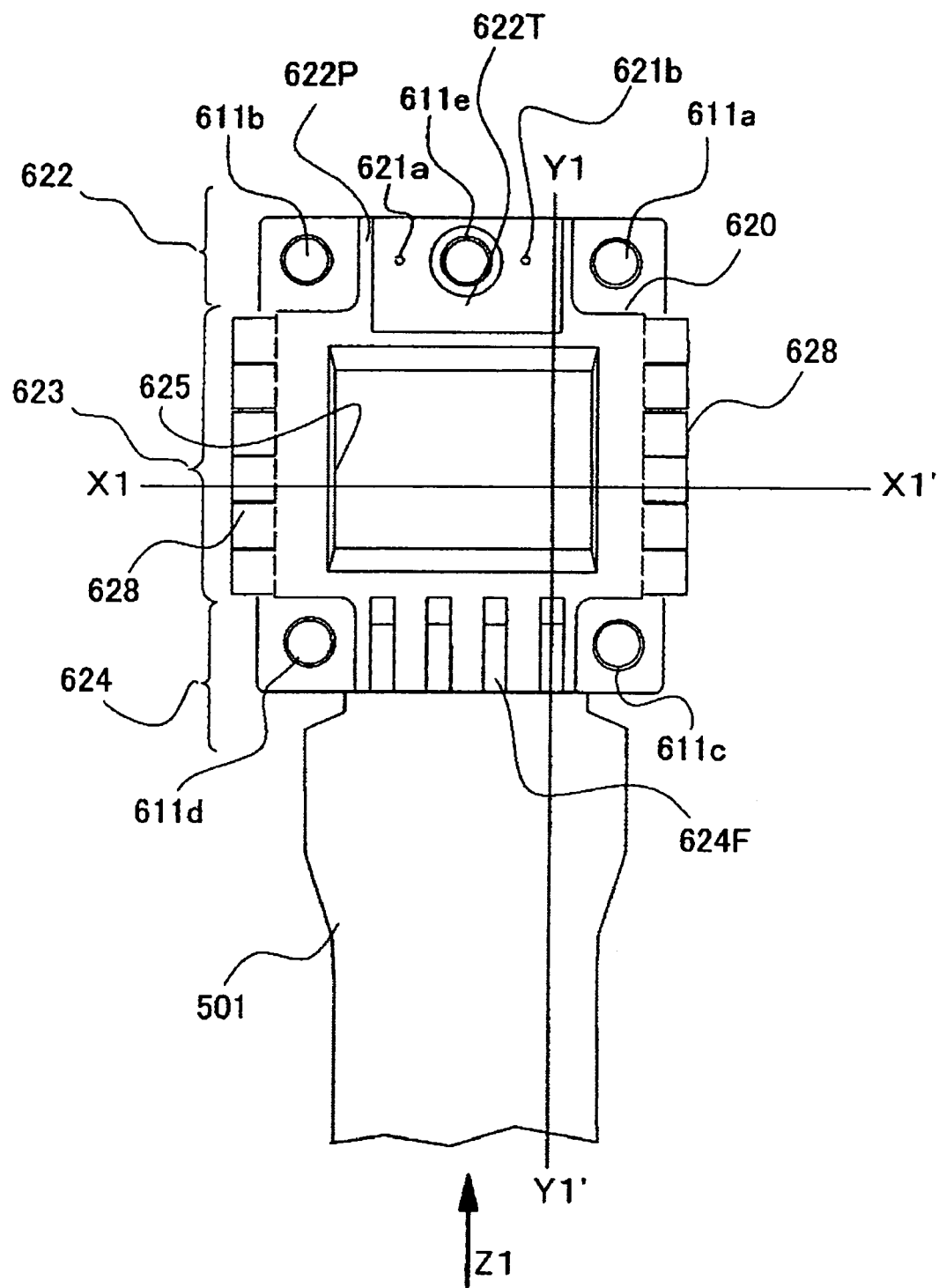
FIG. 5 is a front view of a cased electro-optical apparatus according to the present invention.
Figure 6:
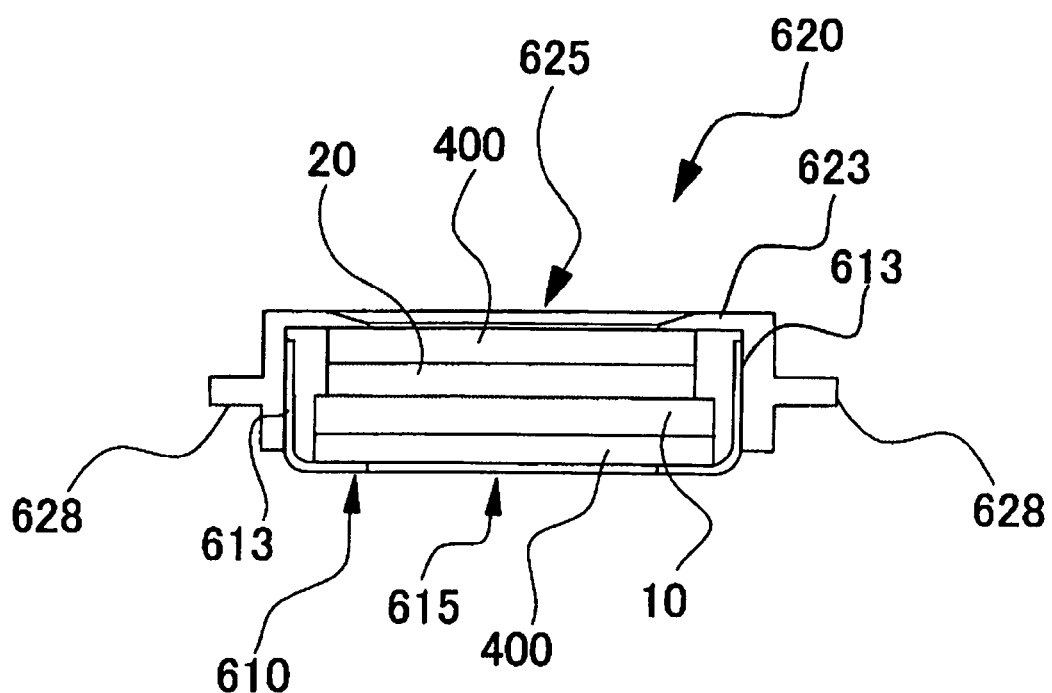
FIG. 6 is a cross-sectional view taken along line X1–X1' of FIG. 5.
Figure 7:
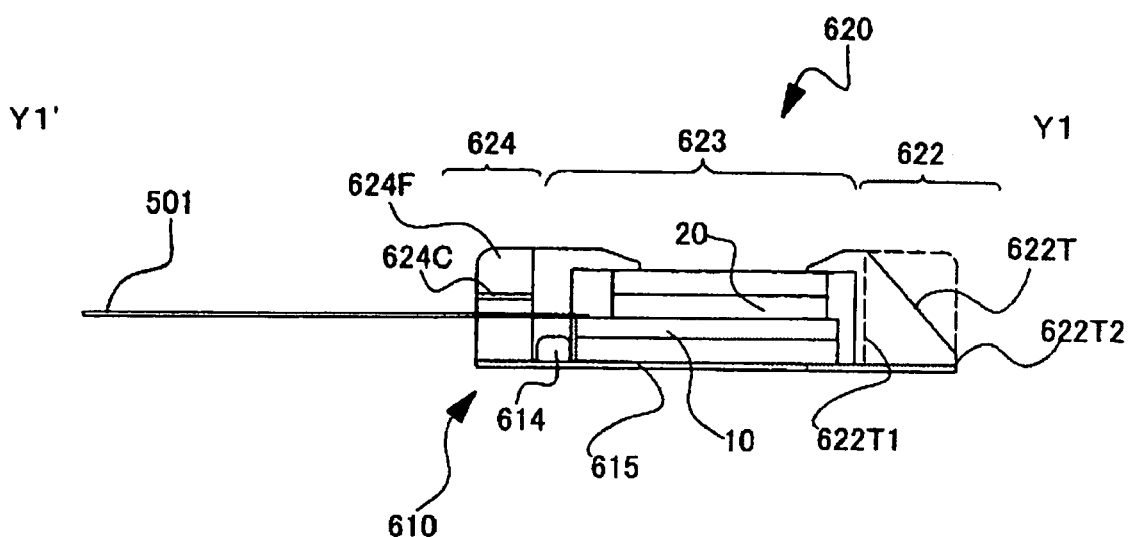
FIG. 7 is a cross-sectional view taken along line Y1–Y1' of FIG. 5.
Figure 8:
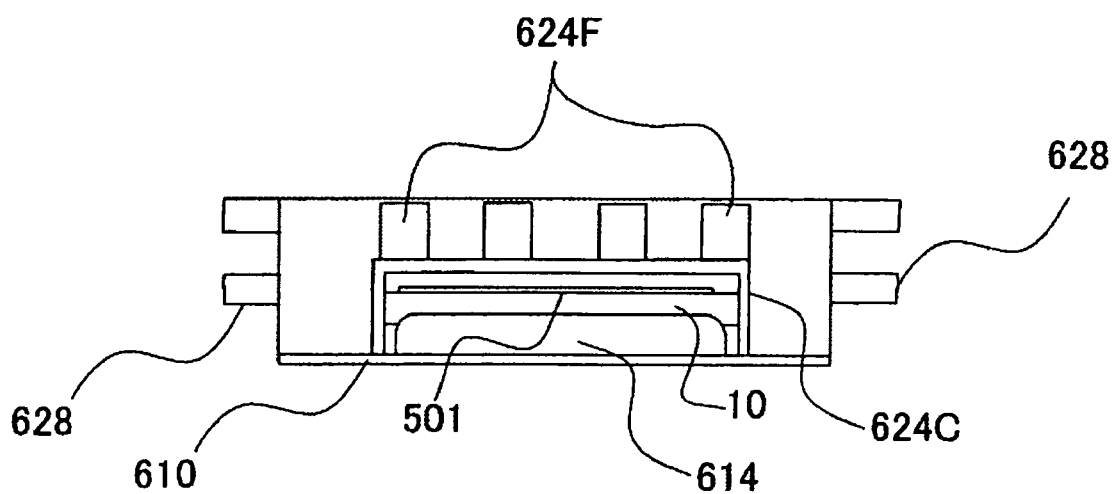
FIG. 8 is a rear view of FIG. 5 viewed from the Z1 direction.

By referring to FIGS. 4 to 8, a cased electro-optical apparatus according to an embodiment of the present invention is described. FIG. 4 is an exploded perspective view showing a case according to this embodiment and the above-mentioned electro-optical unit. FIG. 5 is a front view of the cased electro-optical apparatus. FIG. 6 is a cross-sectional view taken along line X1–X1' of FIG. 5. FIG. 7 is a cross-sectional view taken along line Y1–Y1' of FIG. 5. FIG. 8 is a rear view of FIG. 5 viewed from the Z1 direction. FIGS. 4 to 8 each show the electro-optical unit contained inside the case.

As shown in FIGS. 4 to 8, a case 601 includes a plate 610 and a cover 620. An electro-optical unit 500 contained inside the case 601 is the electro-optical unit shown in FIGS. 2 and 3, and is provided with other optical elements such as an anti-reflection plate disposed on the electro-optical unit. Furthermore, a flexible connector 501 is connected to an external circuit connecting terminal of the electro-optical unit. A polarizer and a retarder may be equipped as part of the optical system of the liquid crystal projector 1100 or may be superposed on the surface of the electro-optical unit 500.

Dust control substrates 400 are disposed on the surfaces not facing the liquid crystal layer 50 of the TFT arrayed substrate 10 and opposing substrate 20 (refer to FIG. 4). The dust control substrate 400 has a predetermined thickness. It prevents dust and dirt around the electro-optical unit 500 from directly attaching to the surface of the electro-optical unit. Consequently, the formation of images of dust or dirt in the enlarged projected image can be efficiently prevented. This is because the dust control substrate 400 has a predetermined thickness, and thus, the light is defocused by shifting the focus and the periphery of the light away from the position of the dust or dirt, i.e., away from the surface of the dust control substrate 400.

In this embodiment, light enters from the cover 620, passes through the electro-optical unit 500, and exit from the plate 610. More specifically, as shown in FIG. 1, the plate 610, not the cover 620, opposes a dichroic prism 1112.

The structures of the plate 610 and the cover 620 that compose the case 601 described in greater detail below.

Firstly, the plate 610, as shown in FIGS. 4 to 8, is composed of a substantially rectangular plate-like member, when viewed from the top, and opposes one of the surfaces of the electro-optical unit 500. In this embodiment, the plate 610 and the electro-optical unit 500 directly contact each other so that the electro-optical unit 500 is placed on the plate 610. More specifically, the plate 610 includes a window 615, a reinforcement 614, bent portions 613, cover fixing holes 612, and mounting holes 611a to 611e.

The window 615 is an opening formed on the substantially rectangular plate-like member. For example, in FIG. 6, the window 615 allows light to pass through from the upper side to the lower side. Emission of the light that has passed through the electro-optical unit 500 is possible because of the window 615. When the electro-optical unit 500 is positioned on the plate 610, the periphery of the image display area 10a of the electro-optical unit 500 contacts the edges of the window 615. In this way, the plate 610 supports the electro-optical unit 500.

The reinforcement 614 is structured by raising a part of the substantially rectangular member above the face of the member and has a three-dimensional form. In this way, the strength of the plate 610 is reinforced. It is preferable to form the reinforcement 614 so that it almost touches one of the sides of the electro-optical unit 500 (refer to FIG. 7).

The bent portions 613 are parts formed by bending a part of each of opposing two sides of a substantially rectangular member toward the inside of the rectangular shape. The outer surfaces of the bent portions 613 are formed so that they contact the inner surface of the cover 620 when the plate 610 and the cover 620 are assembled (refer to FIG. 6). In this way, the heat transferred from the electro-optical unit 500 to the plate 610 can be further transferred to the cover 620 through the bent portions 613.

The cover fixing holes 612 are formed at positions corresponding to protrusions 621 on the cover 620 to engage the protrusions 621. The plate 610 is fixed to the cover 620 by engaging the cover fixing holes 612 and the protrusions 621. In this embodiment, the number of the cover fixing holes 612 is two, as shown in the drawings. To distinguish between the two holes, they are referred to as cover fixing holes 612a and 612b, as required. Correspondingly, the number of the protrusions 621 is also two, as shown in the drawings. To distinguish between the two protrusions, they are referred to as protrusion 612a and 612b, as required.

The mounting holes 611a to 611d are used to mount the cased electro-optical apparatus into the liquid crystal projector 1100, as shown in FIG. 1. In this embodiment, the mounting holes 611a to 611d are formed on the four corners of the substantially rectangular member. Moreover, in this embodiment, in addition to the mounting holes 611a to 611d, another mounting hole 611e is formed. The mounting hole 611e is positioned so that it forms a triangle with mounting holes 611c and 611d. More specifically, each of the mounting holes 611c, 611d, and 611e are located at the apex of the triangle. In this way, the cased electro-optical apparatus may be fixed to the liquid crystal projector 1100 at four points, i.e., the four mounting holes 611a to 611d, or at three points, i.e., the three mounting holes 611c, 611d, and 611e.

Secondly, the cover 620 is a substantially cubic member as shown in FIGS. 4 to 8. The cover 620 faces the surface on the opposite side from the surface that faces the plate 610 of the electro-optical unit 500.

The cover 620 can be composed of a light blocking resin or metal to prevent light leakage in the periphery of the electro-optical unit 500 and, at the same time, to prevent stray light from the periphery entering the image display area 10a. The cover 620 preferably functions as a heat sink for the plate 610 or the electro-optical unit 500. Therefore, the cover 620 is preferably composed of a material with relatively large heat conductivity or, in particular, aluminum, magnesium, copper, or an alloy thereof.

More specifically, the cover 620 can include protrusions 621, a cooling air inlet 622, a cooling air outlet 624, and a cover body 623. The protrusions 621, as described above, are used for fixing the cover 620 to the plate 610. The protrusions 621 formed at the positions corresponding to the cover fixing holes 612a and 612b are referred to as protrusions 621a and 612b, respectively. The protrusions 621 according to this embodiment include the cooling air inlet 622 and a part of a taper 622T, as shown in FIG. 5. Although the protrusions 621 are not actually visible, they are depicted in FIG. 5.

The cover body 623, as shown in FIGS. 4 to 8, is a member having a substantially rectangular solid shape interposed between the cooling air inlet 622 and the cooling air outlet 624, described below. The inner portion of the rectangular solid is hollow to contain the electro-optical unit 500. More specifically, the cover body 623 is a member like box without a lid. Here, the term lid corresponds to the plate 610.

Particularly, the cover body 623 can include a window 625 and side-fins 628. The window 625 is an opening formed on the bottom or the top, in FIGS. 4 and 6, of the box-shaped cover 620. In FIG. 6, the window 625 is the portion that allows light to pass through from the upper side to the lower side. The light emitted from the lamp unit 1102 contained in the liquid crystal projector 1100, shown in FIG. 1, passes through the window 625 and enters the electro-optical unit 500. On the other hand, the side-fins 628 are formed on both sides of the cover body 623. Here, the term 'both sides' refers to the sides without the cooling air inlet 622 and the cooling air outlet 624, described below. More specifically, as shown in FIG. 4 or 6, the side-fins 628 are composed of parts protruding linearly from the sides that are arranged in staggered rows from the cooling air inlet 622 towards the cooling air outlet 624. The side-fins 628 cause an increase in the surface area of the cover body 623 and the cover 620.

As already described above, the inside of the cover 620 contacts the outer surface of the bended portions 613 of the plate 610 when the cover 620 and the plate 610 are assembled (refer to FIG. 6). In this way, the heat of the electro-optical unit 500 is efficiently transferred to the cover 620 through the plate 610 and the bended portions 613.

The cooling air inlet 622, as shown in FIG. 4 or 7, can have a taper 622T and cooling air guides 622P. In this embodiment, the taper 622T is substantially a triangular pole with a right-triangle-shaped bottom surface. The taper 622T is shaped so that one of the sides of the triangular pole is attached to one of the sides of the cover body 623. In this case, the side of the triangular pole attached to the side of the cover body 623 is the side in contact with the apex at the right angle of the bottom surface of the triangular pole. Consequently, the height of the taper 622T is largest at the base 622T1 and gradually decreases towards the tip 622T2. Here, the term height refers to the distance in the vertical direction in FIG. 7. In FIG. 7, the vertical direction is indicated by the dashed line. On the other hand, the cooling air guides 622P are composed of a vertically arranged wall disposed along the side of the bottom surface of the triangular pole, which is the side in contact with the two apexes not touching the right angle. The height of the cooling air guide 622P is constant between the base 622T1 and the tip 622T2, although the height of the taper 622T reduced from the base 622T1 to the tip 622T2.

Finally, the cooling air outlet 624, as shown in FIGS. 4, 5, or 8, can include a flexible connector outlet 624C and rear fins 624F. The flexible connector outlet 624C is formed on a side of the cover body 623 opposite to the side with the taper 622T. More specifically, as shown in FIG. 8, the flexible connector outlet 624C is composed of a material with a horseshoe-shaped cross-section and is attached to the side of the cover body 623 so that the opening of the horseshoe-shaped cross-section faces downwards in the drawing. A flexible connector 501 connected to the electro-optical unit is passed through the space surrounded by the horseshoe and leads out to the outside.

On the other hand, the rear fins 624F are mounted onto, so to speak, the ceiling of the horseshoe-shaped cross-section of the flexible connector outlet 624C. More specifically, as described in detail in FIGS. 4, 5, or 8, a plurality of the rear fins 624F are arranged in parallel (in FIG. 6 four linearly protruding rear fins are arranged in parallel) in the same direction as the above-mentioned linearly protruding side-fins 628 are extended. In this way, the surface area of the cover 620 increases.

By structuring the cover 620 as described above, the air sent from the sirocco fan 1300 of the liquid crystal projector 1100 shown in FIG. 1 flows along the case 601 and the cover 620 as shown in FIG. 9. FIG. 9 is a perspective view of the cased electro-optical apparatus and shows a typical air flow inside the cased electro-optical apparatus. In order to achieve the cooling air flow inside the liquid crystal projector 1100 shown in FIG. 9, the cased electro-optical apparatus, i.e., the light valves 100R, 100G and 100B, must be disposed so that the outlets 100RW, 100GW, and 100BW shown in FIG. 1 oppose the cooling air inlet 622 composing the cover 620.

The case 601 according to this embodiment is efficiently cooled by the flows of air, such as the cooling air flows W1, W2, and W3 shown in FIG. 9. In this way, the heat transferred from the electro-optical unit 500 to the plate 610 and then to the cover 620 is finally dissipated extremely efficiently to the outside. In particular, the cooling air guide 622P enables an air flow (W2 in the drawing), which would have not reached the cover 620 if the cooling air guide 622P is not provided to be used for cooling the case 601 and/or the cover 620, and the side-fins 628 and rear fins 624F promote the cooling of the cover 620, these are two characteristic effects of this embodiment.

Cooling efficiently the cover 620 means that the flow of heat from the electro-optical unit 500 to the plate 610 or the cover 620 via the bended portions 613 is always effectively maintained. In other words, because the cover 620 is normally in a well-cooled condition, the heat sink function is always effective. In this way, heat can be effectively taken way from the plate 610 and, furthermore, from the electro-optical unit 500 by the cover 620.

The electro-optical unit 500 according to this embodiment does not store excessive heat. Therefore, degradation of the liquid crystal layer 50 and generation of hot spots may be prevented, and thus, the possibility of image degradation caused by these is extremely small.

Figure 10:
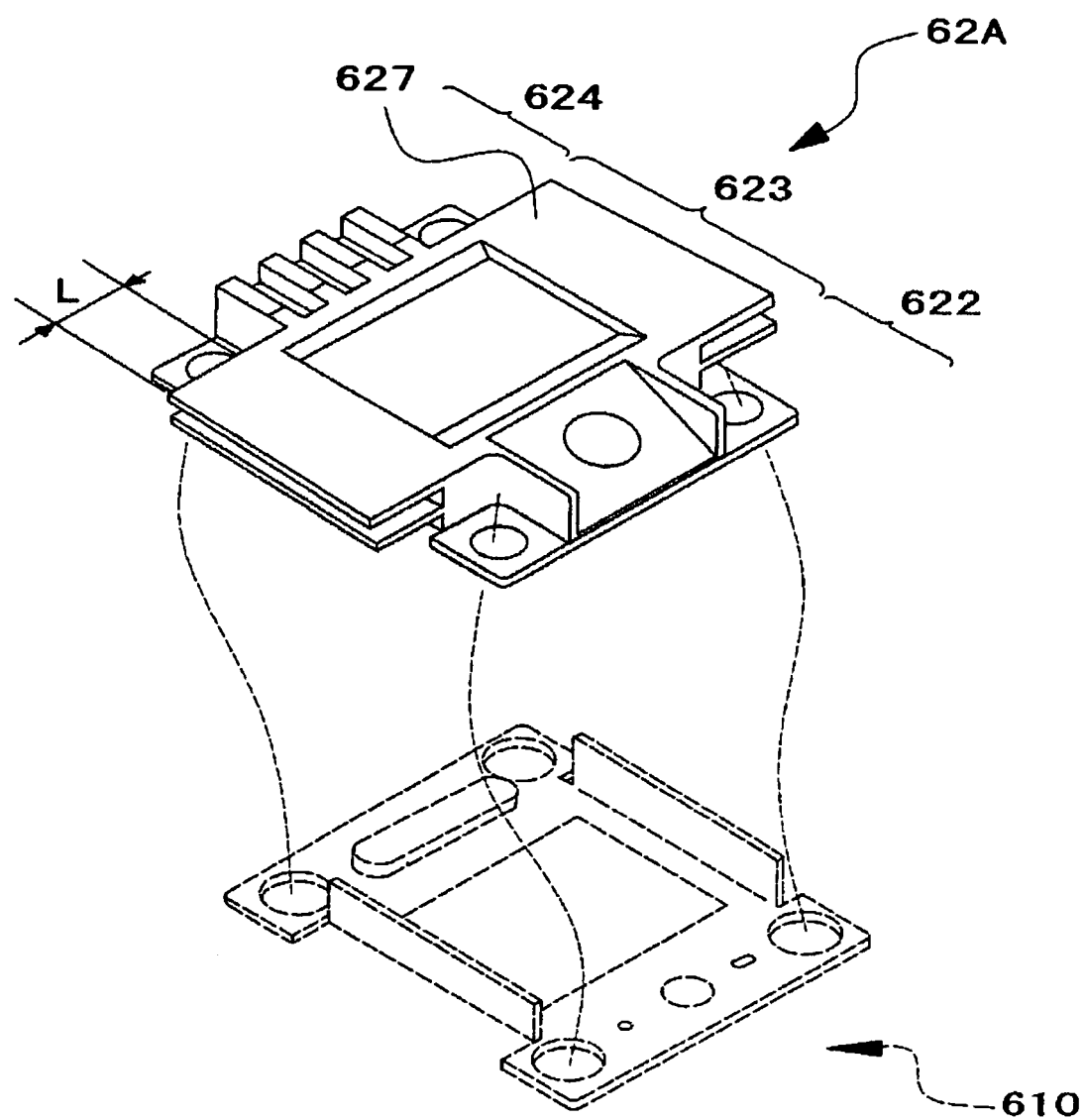
FIG. 10 is a perspective view of a modification of the cover with side-fins having a different shape compared to the cover shown in FIG. 9.
Figure 11:
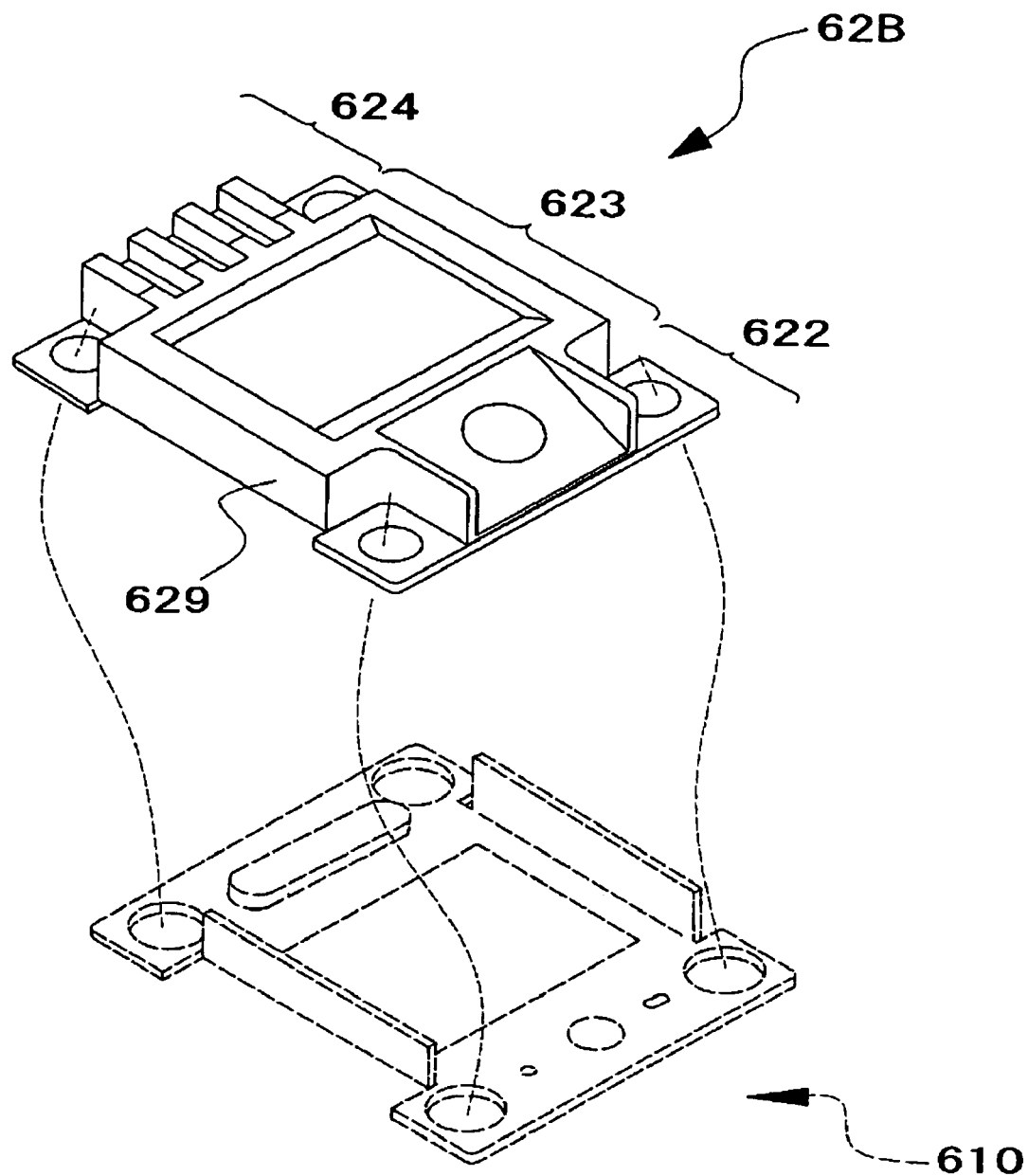
FIG. 11 is perspective view of a modification of the cover without side-fins compared to the cover shown in FIG. 9.
Figure 12:
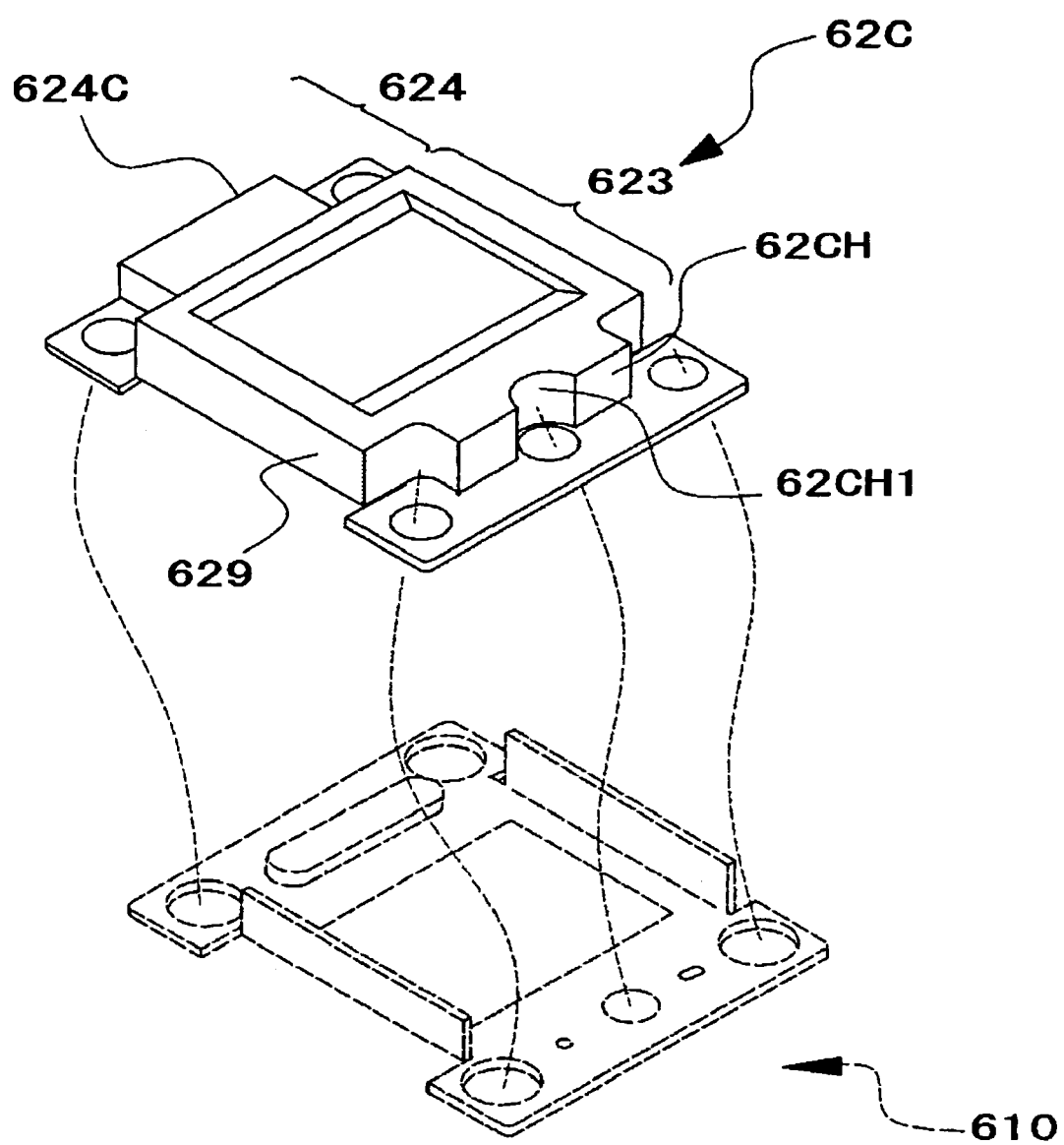
FIG. 12 is a perspective view of a modification of the cover without a cooling air inlet and rear-fins compared to the cover shown in FIG. 9.

The basic structure and the function of the cased electro-optical apparatus according to this embodiment are as described above. In addition to the structure and function, the cover 620 has the following characteristics. The cover 620 is described below with reference to FIGS. 10 to 12. FIGS. 10 to 12 are perspective views of modifications of the cover 620 obtained by modifying the shape of the cover 620 accordingly. For the drawings referred to below, the same reference numerals as those used for the drawings referred to above are used when the element indicated by the reference numeral is substantially the same as the previously-mentioned element.

As shown in FIG. 10, a cover 62A has side-fins shaped differently compared to the cover 620. More specifically, the cover 62A does not have the side-fins 628 composed of relatively short protrusions arranged in staggered rows. Instead, it has side-fins 627 that linearly protrude along the entire length of the cover body 623. The side-fins 627 protrude out from the cover 62A much further (refer to the character L in FIG. 10) compared to the side-fins 628 arranged in staggered rows as shown in FIG. 9. In this way, the linear side-fins 627 cause an increase in the surface area to a level similar to the increase in the surface area caused by the side-fins 628 arranged in staggered rows. Consequently, being exclusive to the surface area, the cover 62A is expected to have a heat dissipation ability similar to the cover 620. The actual heat dissipation ability also depends on the influence of the air flow in the periphery of the cover (refer to FIG. 9).

Next, as shown in FIG. 11, a cover 62B has no side-fins as compared to the cover 620 or 62A, and, the two sides of the cover body 623 are flat surfaces 629. In this way, the entire surface area of the cover 62B is smaller compared to the cover 620 or 62A, but, instead, the size can be reduced.

As shown in FIG. 12, a cover 62C has a cooling air inlet 622 and a cooling air outlet 624 with different shapes compared to the cover 620, 62A, or 62B. On the cover 62C, there is not a part like cooling air inlet 622 of the cover 620, 62A, or 62B. Instead, the cover 62C has a protrusion 62CH for forming the protrusions 621 that are engaged to the cover fixing holes 612 of the plate 610. The protrusion 62CH has a notch 62CH1 that corresponds to the mounting hole 611e. The cooling air outlet 624 has a flexible connector outlet 624C as in the cover 620 but does not have rear-fins F provided integrally thereto. The cover 62C has no side-fins as in the cover 62B. In this way, the cover 62C has an extremely simple structure, and thus, its size is reduced compared to the cover 62B.

The covers 62A, 62B, and 62C that are modifications of the cover 620 are each removable from the plate 610 (refer to FIGS. 10 to 12). More specifically, a case may be structured so that each of the covers 62A, 62B, 62C, and 620 may be disposed on the plate 610 interchangeably.

The case of this embodiment structured as described above and a electro-optical unit 500 contained in the case have the following effects. Firstly, the case of this embodiment may have various covers interchangeably as described above. Therefore, each of the light valves 100R, 100G and 100B of the liquid crystal projector 1100 shown in FIG. 1 may be contained in a case with a different shape.

For example, the light valve 100R may be a cased electro-optical apparatus using the cover 620 (refer to FIG. 9), the light valve 100G may be a cased electro-optical apparatus using the cover 62A (refer to FIG. 10), and the light valve 100B may be a cased electro-optical apparatus using the cover 62B (refer to FIG. 11). Each of the light valves 100R, 100G, and 100B may be a cased electro-optical apparatus with a cover structured differently.

The shape of the cover, i.e., the cover 620, 62A, 62B, or 62C, for each of the light valves 100R, 100G, and 100B may be determined depending on the difference of positioning, difference of the environment, or other various factors of the light valves 100R, 100G, and 100B of the liquid crystal projector 1100.

Figure 13:
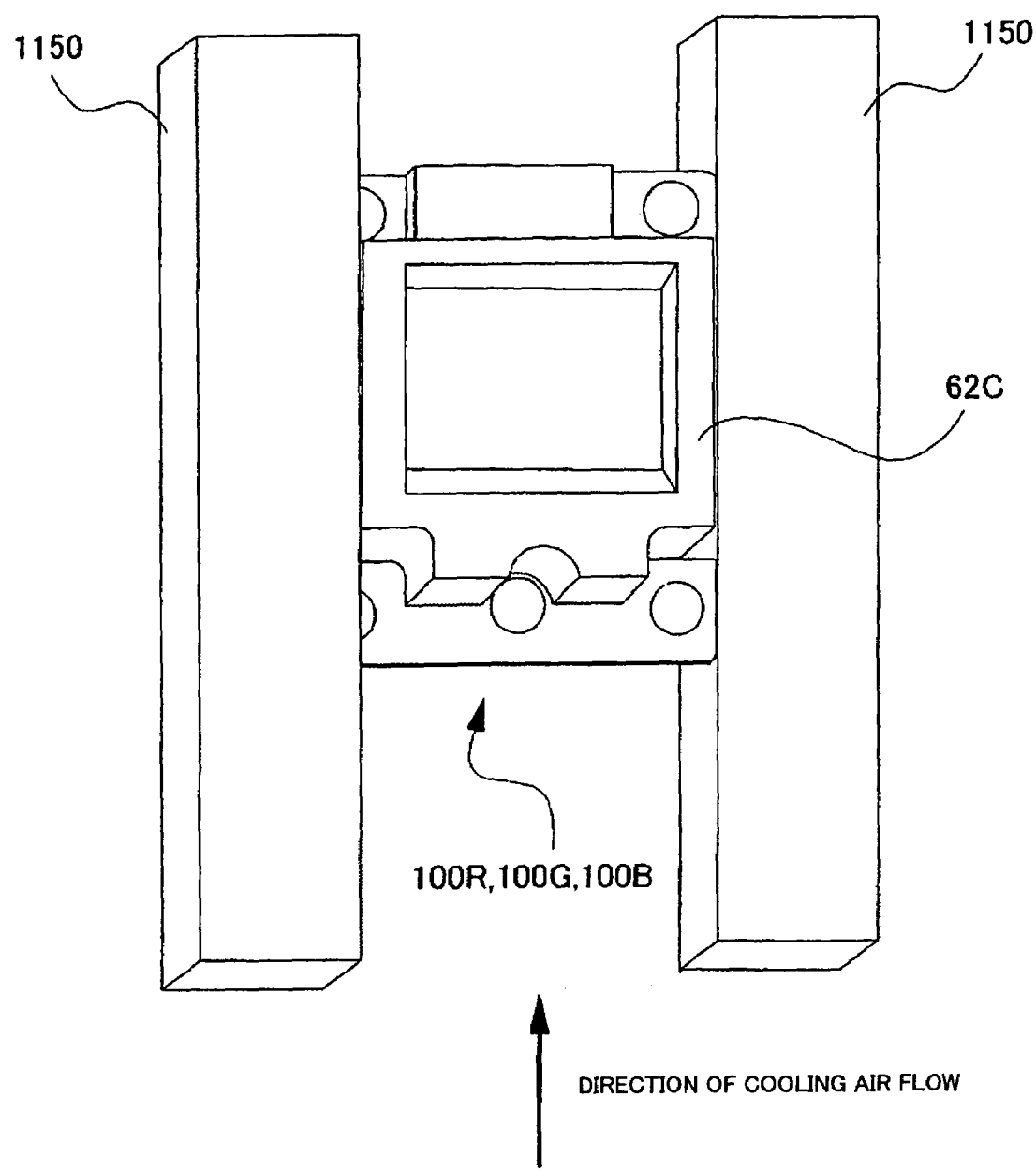
FIG. 13 is an explanatory drawing showing an example of a specific positioning of a electro-optical unit in a case that functions as the light valve shown in FIG. 1 inside a liquid crystal projector.

This is described below more specifically. Firstly, in the periphery of the light valves 100R, 100G, and 100B of the liquid crystal projector 1100 shown in FIG. 1, columns 1150, as shown in FIG. 13, may be formed. In FIG. 13, the columns 1150 are vertically disposed so that the light valve 100R, 100G or 100B is interposed between them. The columns 1150 help to position and fix the light valve 100R, 1001 or 10B. Moreover, if the columns 1150 are composed of, for example, an appropriate metal that has relatively large heat conductivity or a silicon rubber, the columns 1150 may function as heat sinks for the light valve 100R, 100G, or 100B. When the columns 1150 are used as heat sinks, it is preferable that the columns 1150 and the light valve 100R, 100G or 100B have the largest contact area possible. In this way, heat transfer between the two units becomes active and the electro-optical unit 500 will be effectively cooled. If the columns 1150 are used as heat sinks, concentrating the cooling air in the periphery of the cover 620 (refer to FIG. 9) in order to effectively cool the electro-optical unit 500 inside the light valve 100R, 100G, or 100B is no longer critical.

From this, when the light valve 100R, 100G or 100B is interposed between the columns 1150 shown in FIG. 13, it is preferable to use a case equipped with the cover 62C (FIG. 12) that has no side-fins, instead of using a case equipped with the cover 620 or 62A (FIG. 9 or 10) that has the side-fins 627 or 628. Of course, it is also preferable to use the cover 62B (FIG. 11). In this way, the flat surfaces 629 and the sides of the columns 1150 can be in good contact, and thus, the heat taken away from the electro-optical unit 500 is efficiently transferred to the cover 62C and then to the columns 1150. Consequently, the electro-optical unit 500 can be effectively cooled. On the other hand, if there are side-fins, such as side-fins 627 or 628, present on the cover 62C, the contact areas of the sides of columns 1150 and the cover become small. Consequently the rate of heat take-up from the electro-optical unit 500 decreases.

Secondly, light split into red light, green light, and blue light by the dichroic mirrors each enter the light valves 100R, 100G, and 100B, respectively, of the liquid crystal projector 1100 shown in FIG. 1. In this case, depending on different circumstances that occur due to the splitting of light, the different cover 620, 62A, 62B, or 62C may be selected and used.

Specifically, different circumstances that occur due to the separation of light might be as follows. In other words, as described above, the phrase refers to when white light is split into red light, green light, and blue light. The light valve 100B, which the blue light enters, is expected to undergo a large temperature increase compared to the light valves 100R and 100G, which the red light and green light enter, respectively. For this reason, the liquid crystal layer 50 is easily degraded and hot spots are easily generated in the electro-optical unit 500 of the light valve 100B compared to the electro-optical unit 500 of the light valves 100R and 100G. This is because the wavelength of the blue light is shorter than the wavelengths of the red light and green light, and, thus, the energy of the blue light is relatively larger.

For this reason, when forming the light valves 100R, 100G and 1000B so that they correspond to the red light, green light, and blue light, respectively, it is preferable to use the cover 620 (FIG. 9) or the cover 62A (FIG. 10) with a large heat dissipation ability for the light valve 100B and use the cover 62B (FIG. 11) or the cover 62C (FIG. 12) with no large heat dissipation ability for the other light valves 100R and 100G. In this way, the electro-optical unit 500 inside the light valve 100B is cooled more effectively. Also, the occurrence of a difference in the amount of thermal storage between the electro-optical unit 500 for the light valve 100B and the light valves 100R and 100G can be prevented. Consequently, the liquid crystal projector 1100 can be operated stably.

Thirdly, besides the above circumstance, there may be physical space limitations wherein sufficient space inside the liquid crystal projector 1100 for disposing the light valves 100G and 100B is available, but space for disposing the light valve 100R is insufficient. In such case, the cover 62A (FIG. 10), which is large in size but has a large heat dissipation ability, may be used for the former and the cover 62C (FIG. 12), which is small in size but has small heat dissipation ability, may be used for the latter. In this way, the light valves 100R, 100G and 100B may be disposed inside a single liquid crystal projector 1100 without causing problems.

In some case, the cooling air sent out from the outlets 100RW, 100GW, and 100BW, which are formed to correspond to the light valves 100R, 100G, and 100B, respectively, is not uniform between the light valves 100R, 100G, and 100B (for example, the direction the cooling air is sent out might differ). For example, a situation might occur wherein cooling air is strongly sent out to the light valves 100R and 100B while cooling air is not so strongly sent out to the light valve 100G One of the major reasons for this situation is the fact that the sirocco fan 1300 of the liquid crystal projector 1100 sends out wind swirling in a spiral pattern, as described above with reference to FIG. 1. Also the size, shape and positioning of the cooling air ducts not shown in the drawings that connect the sirocco fan 1300 and the outlets 100RW, 100GW, and 100BW are contributing factors. Therefore, in such a situation, it is preferable to select one of the covers 620, 62A, 62B, and 62C, in accordance with the configuration of the outlet of the cooling air. For example, if as described above, the cooling wind is not very strongly sent out to the light valve 100G and is strongly sent out to the light valves 100R and 100B, the cover 620 (FIG. 9) or the cover 62A (FIG. 10) with good heat dissipation ability may be used for the former and the cover 62B (FIG. 11) or the cover 62C (FIG. 12) may be used for the latter.

As described above, in this embodiment, it is possible to use a case with a cover having different shapes depending on the position or environment in which the light valves 100R, 100G and 100B are disposed inside the liquid crystal projector 1100 or other various factors. In any case, the covers having different shapes according to the present embodiment are interchangeable. Consequently, various advantages are gained such as efficient cooling of the electro-optical unit 500, prevention of the generation of unevenness in the temperature increase of the light valves 100R, 100G and 100B, and positioning of each of the light valves 100R, 100G and 100B without any problems.

Although it is possible to use different covers in this embodiment, one plate 610 may be prepared to be used commonly by the differently-shaped covers 620, 62A, 62B, and 62C. For this reason, the production cost of the case according to this embodiment is inexpensive compared to the production cost of changing the entire case.

Figure 14:
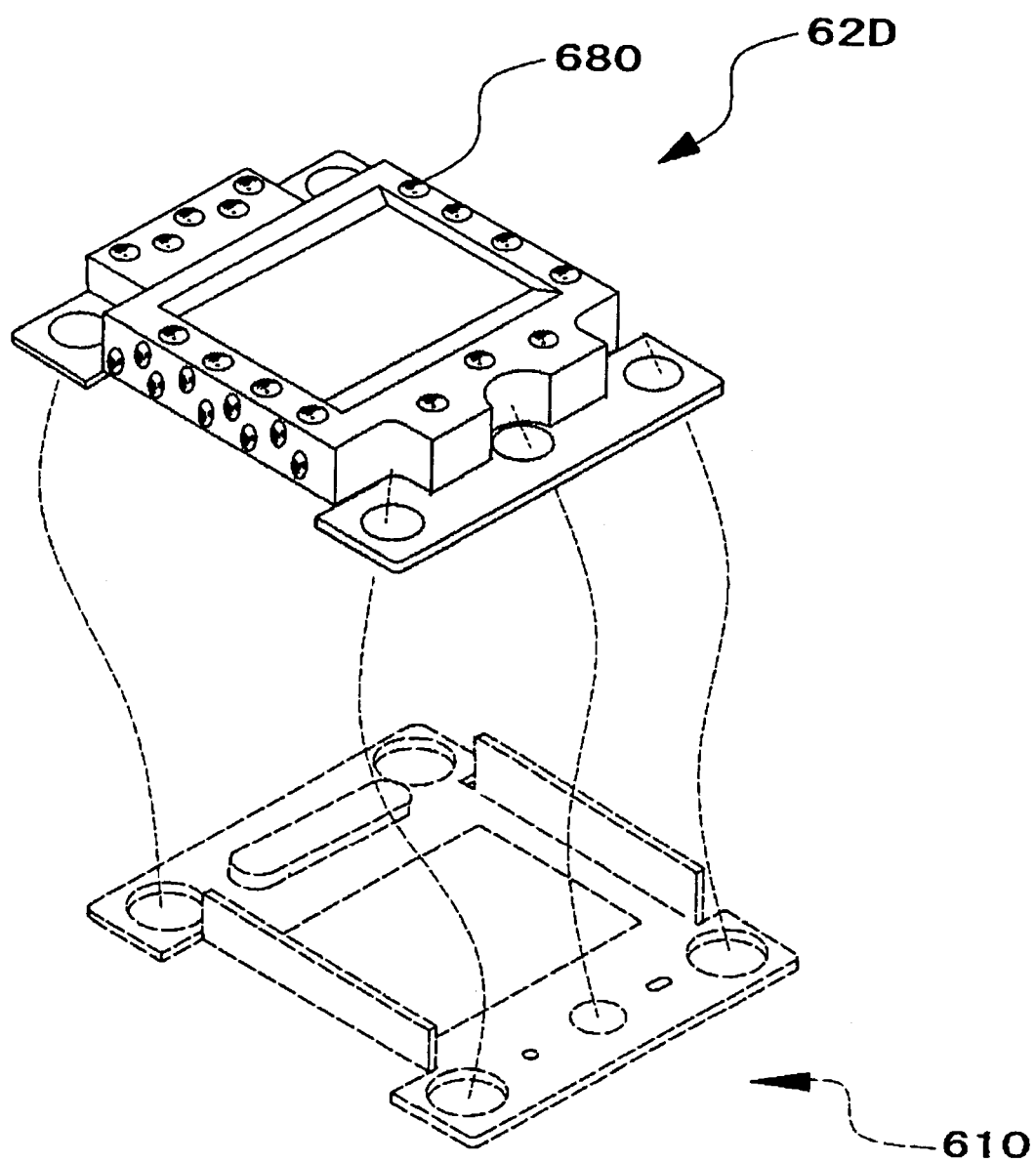
FIG. 14 is a perspective view of a modification of the cover with dimples formed on the cover shown in FIG. 12.

In this embodiment, as examples of the covers to be interchangeably disposed on the plate 610, four types of covers, i.e., covers 620, 62A, 62B, and 62C, were presented. The present invention, however, is not limited to these covers. For example, a cover may have a shape wherein the rear fins 624F are removed from the cover 620 or wherein the cooling air inlet 622 is removed from the cover 62B. In this way, there is an infinite number of modifications for the cover. Another specific example is a cover 62D shown in FIG. 14. The cover 62D, as shown in FIG. 14, is based on the shape of the cover 62C (FIG. 12), but it has a plurality of dimples 680 formed on the surface. In this way, although the cover 62D does not have side-fins 627 or 628 or rear fins 624F, the dimples 680 increases its surface area, and thus, the heat dissipation ability is great.

In any case, the present invention includes various modifications.

The embodiment according to the present invention described above has a structure wherein the cover 620, 62A, 62B, and 62C, each having different shapes, are interchangeably used for the plurality of light valves 100R, 100G and 100B disposed inside one liquid crystal projector 1100. The present invention, however, also includes, for example, a liquid crystal projector having only one light valve wherein a cover is used interchangeably with other covers having different shapes included in other liquid crystal projectors.

The embodiment described above has a structure that includes one plate 610 commonly used for a plurality of covers 620. The present invention also includes an opposite structure. In other words, this structure includes one cover commonly used for a plurality of plates. This is possible because the concept described above is applicable to both the cover and the plate.

It should be understood that the present invention is not limited to the above-mentioned embodiments. The present invention may be changed as long as the essence and the idea of the invention presented in the claims and the entire specification is not contradicted. A cased optical apparatus, a projection display apparatus, and/or the case changed in such way are included in the technical range of the present invention.

Furthermore, in addition to a liquid crystal panel, the present invention may be applied to electro-optical unit that use an electron emission element such as an electrophoretic migration apparatus, electro-luminescence apparatus, a plasma display apparatus, a field emission display, and a surface-conduction electro-emitter display.

Thus, while this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing form the spirit and scope of the invention.

What is claimed is:

1. A projection display apparatus, comprising:
a light source;
a plurality of electro-optical units that receive light from the light source;
an optical system that guides the light to the electro-optical units;
a projection optical system that projects light emitted from the electro-optical units;
a first case that contains at least one of the electro-optical units; and
a second case having a different shape compared to the first case that contains at least one of the electro-optical units not contained in the first case, the different shape depending on a type of incident light or a position of the second case relative to at least one of the optical system or the projection optical system.

2. The projection display apparatus according to claim 1, the first case and the second case each including a plate opposing one side of the electro-optical unit and a cover attachable to the plate that covers the electro-optical unit;
the first case and the second case having different shapes.

3. The projection display apparatus according to claim 2, including the first case having a first cover with a larger surface area and the second case having a second cover with a smaller surface area.

4. The projection display apparatus according to claim 2, including, the cover with a surface area increasing portion for increasing the surface area;
the first case having a third cover with a surface area increased by the surface area increasing area;
the second case having a fourth cover with a surface area increased to a lesser degree compared to a third cover by the surface area increasing area.

5. The projection display apparatus according to claim 1, the first case including a fifth cover with a surface area increasing portion for increasing the surface area;
the second case including a sixth cover without a surface area increasing portion.

6. The projection display apparatus according to claim 1, including a plurality of electro-optical units corresponding to independent light components separated from light emitted from a light source;

the first case corresponding to at least one light component;

the second case corresponding to the remaining light components.

7. The projection display apparatus according to claim 6, the independent light components being red, green, and blue;

the first case corresponding to blue;

the second case corresponding to red and green;

the surface area of the first case being larger than the surface area of the second case.

* * * * *